M. STAHL.
TRACTION ENGINE.
APPLICATION FILED DEC. 27, 1917.

1,338,754.

Patented May 4, 1920.
6 SHEETS—SHEET 3.

Fig.3

Inventor:
Michael Stahl
By [signature] M. G. Whiteley
his Attorney

M. STAHL.
TRACTION ENGINE.
APPLICATION FILED DEC. 27, 1917.

1,338,754.

Patented May 4, 1920.
6 SHEETS—SHEET 5.

Fig. 5

Inventor:
Michael Stahl.
By ... his Attorney.

UNITED STATES PATENT OFFICE.

MICHAEL STAHL, OF MINNEAPOLIS, MINNESOTA, ASSIGNOR TO CULTITRACTOR COMPANY, OF MINNEAPOLIS, MINNESOTA, A CORPORATION OF MINNESOTA.

TRACTION-ENGINE.

1,338,754.     Specification of Letters Patent.     Patented May 4, 1920.

Application filed December 27, 1917. Serial No. 209,028.

*To all whom it may concern:*

Be it known that I, MICHAEL STAHL, a citizen of Germany, (who have declared my intention of becoming a citizen of the United States,) residing at Minneapolis, in the county of Hennepin and State of Minnesota, have invented certain new and useful Improvements in Traction-Engines, of which the following is a specification.

My invention relates to traction engines and has for its object to provide a small and compact farm tractor to do such work as plowing, cultivating and similar operations. It is a part of my object to provide a compact and simple organization of frame members supported in balanced relation upon a single axle having traction wheels thereon, said traction wheels being so mounted as to be able to take relatively different positions of separation to enable the traction engine to be driven either between a pair of rows or so as to straddle a row. It is a further object of my invention to provide a wholly novel organization of driving elements together with means for controlling the same such that the vehicle is entirely steered at all times by the drive of the tractor wheels, there being no steering ground wheel. It is a further object of my invention to provide improved means for connecting a plow, cultivator, or similar device to the tractor and for controllably supporting the same. It is a further object of my invention to provide a front tractor wheel and a rear guide wheel so related to one another and to the plow that the tractor wheel will travel in the furrow in advance of the plow so as to engage the wall of said furrow and the guide wheel will travel behind the plow within and so as to engage the wall of the furrow just plowed.

The full objects and advantages of my invention will appear in connection with the detailed description thereof and are particularly pointed out in the claims.

In the drawings, illustrating the application of my invention in one form,—

Figure 1:
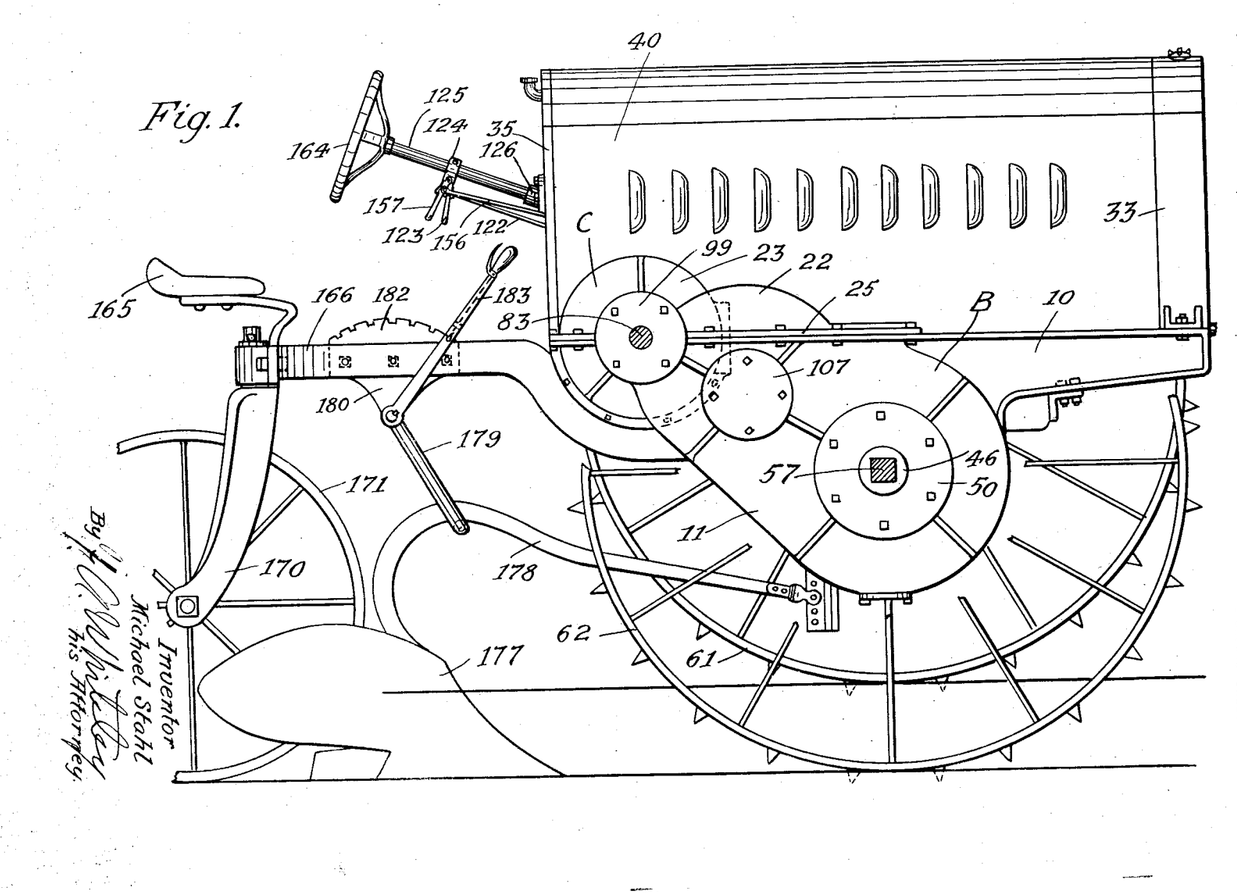
Figure 1 is a side elevation of my tractor with some parts removed.
Figure 3:
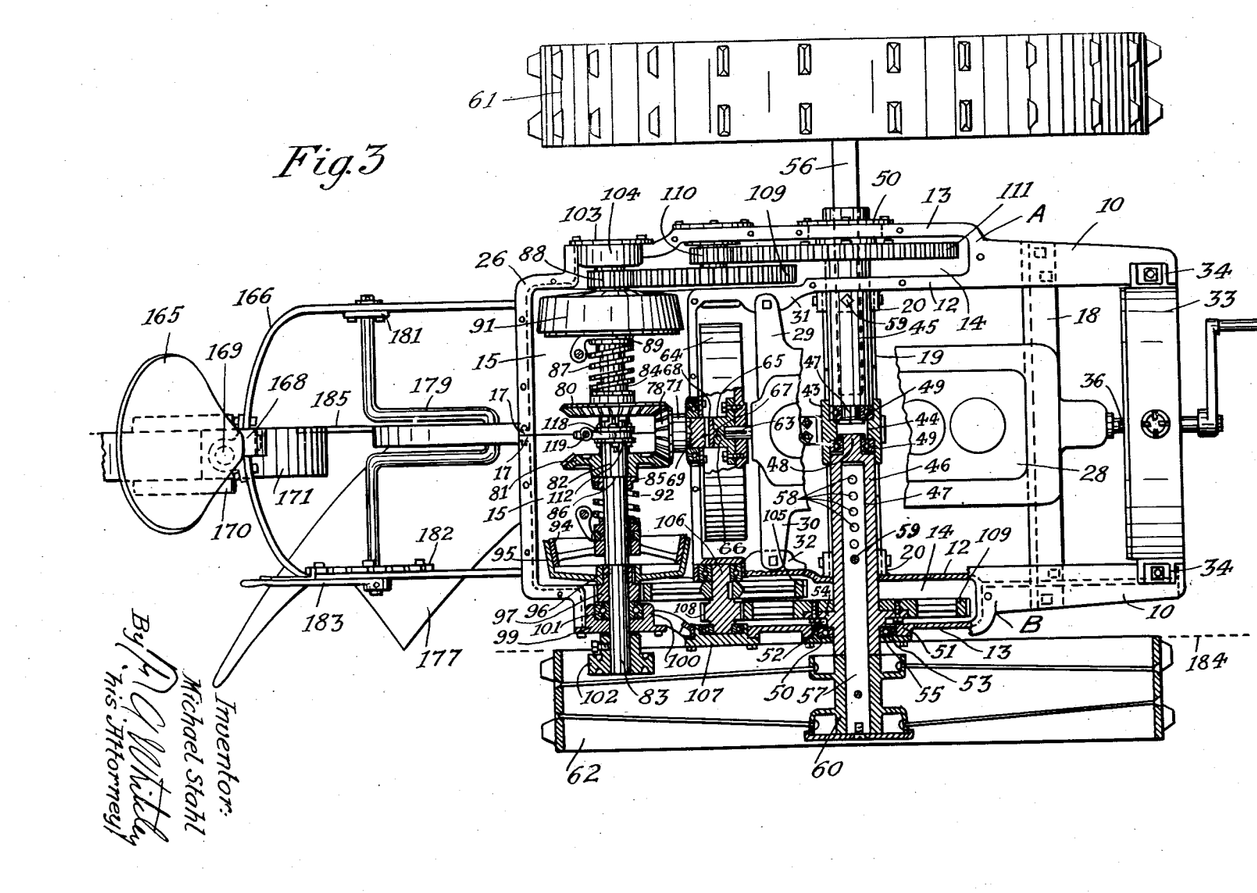
Fig. 3 is a sectional plan view of my traction engine with some parts broken away and showing one of the traction wheels in extended position.

The main frame of my traction engine is made up of three castings which will be described in detail and which when united form housings for the various driving transmission and control elements of the traction engine. These three castings are designated respectively A, B and C and their general relation is well shown in Fig. 5. Castings A and B are symmetrical right hand and left hand members with corresponding parts thereon (here designated by the same reference numerals) which are best illustrated in Figs. 1 and 3. The castings comprise a forwardly extended limb 10, a central housing member 11 depending below the member 10 and comprising an inner plate 12 and an outer plate 13 with the drive gear housing 14 between the same and an inwardly projecting semi-cylindrical casing portion 15. The portions are provided at their inner limits with semi-circular lips 16 and 17 respectively and by means of bolts 218 passing through the flanges 16 and 17 the members are rigidly united. A cross bar 18 of angle iron is rigidly secured to the forwardly extended limb 10 and a channel bar 19 extends between the depending housing members 11 with its ends bolted to lug extensions 20 from said members, as clearly shown in Figs. 4 and 5. The castings A and B are thus rigidly held together to form the base frame of the machine. This is additionally strengthened by the cap member C which as clearly shown in Figs. 1 and 4, embodies side cover portions 21 and 22 and a central semi-cylindrical portion 23 all being united by a multiplicity of bolts 24 through correspondingly positioned flanges 25 and 26 on the contacting edges of the member C and the symmetrically positioned members A and B. This arrangement, in addition to providing the housing 14 for the drive gearing, also provides a central cylindrical housing 27 for transmission and control elements, as will hereafter be more fully pointed out. The motor 28 is supported at its front portion upon the bar 18 and by means of arms 29 and 30 is supported by its rear portion upon lugs 31 and 32 formed in conjunction with the inner walls 12 of the central members 11 of castings A and B. A radiator 33 of usual construction is secured by means of lugs 34 to the front end of portion 10 of castings A and B. Resting upon the rear flange 25 of member C is a dash or service board 35 which is rigidly held in parallel alinement with the radiator 33 by rods 36. A gasolene tank 37 is supported upon rods 36 and conveys gasolene by gravity feed through tube 38 to the carbureter 39. A hood 40 of usual construction incloses the engine and other operative parts above the castings A, B and C.

Figure 4:
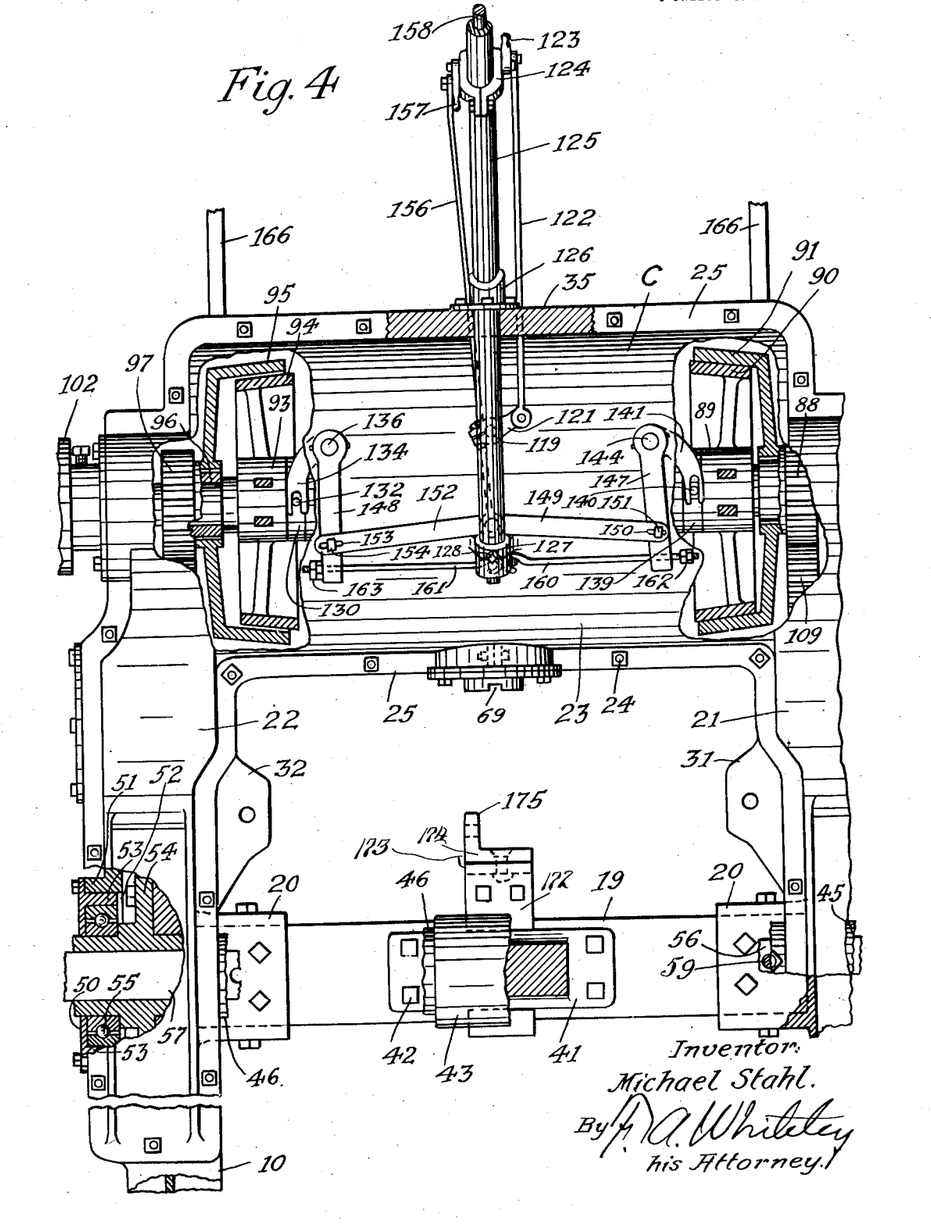
Fig. 4 is a part sectional plan view showing certain features not shown in Fig. 3.
Figure 5:
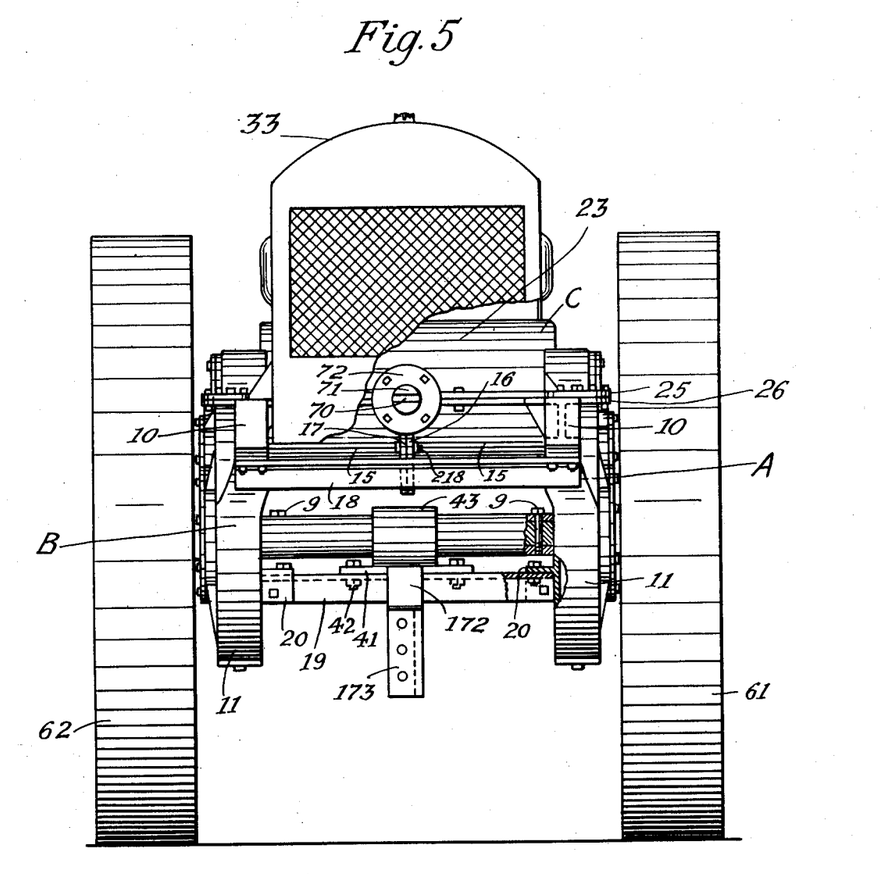
Fig. 5 is a rear elevation of the traction engine with some parts broken away.

Bolted to the cross bar 19 by means of a base 41 and bolts 42 is a short tubular bearing stand 43 which has an inside central annular flange 44, as best shown in Fig. 3. Shaft members 45 and 46 each provided with a square hole 47 within the interior thereof have trunnion extensions 48 that are received by ball bearing members 49 within the tubular bearing 43 and at each side of the central flange 44. The hollow axle members 45 and 46 extend through the walls 12 and plates 50 secured to thickened portions 51 of walls 13. As best shown in Fig. 4 each thickened portion surrounds a circular opening 52 in the walls 13, into which project annular flanges 53 formed integral with plates 50. Inside of flanges 53 between plates 50 and circular lugs 54 on the shaft members 45 and 46 are ball bearings 55 by which, with the bearings 49 the shaft members 45 and 46 are rotatably held within the frame. In the square apertures 47, within the shaft members 45 and 46, square shafts 56 and 57 are slidably positioned having thereon a multiplicity of holes 58. A pin 59 extending through one or the other of the holes 58 secures the square shafts 56 and 57 within the shaft members 45 and 46 in any desired adjusted position. Wheel hubs 60 of traction wheels 61 and 62 are pinned fast to the square shafts 56 and 57. The traction wheels are, therefore rotatably held on the frame but in such manner that they may be spread apart or drawn closer together within certain fixed limits as the use to which the device is put may require. In the above noted construction it will be observed that the outer bearing of the axle members 45 and 46 is removably secured to the depending housing portion 11 of the frame by means of the plate insert 50 and this feature is characteristic of my invention wherein the frame itself provides a housing for the operative parts.

Figure 2:
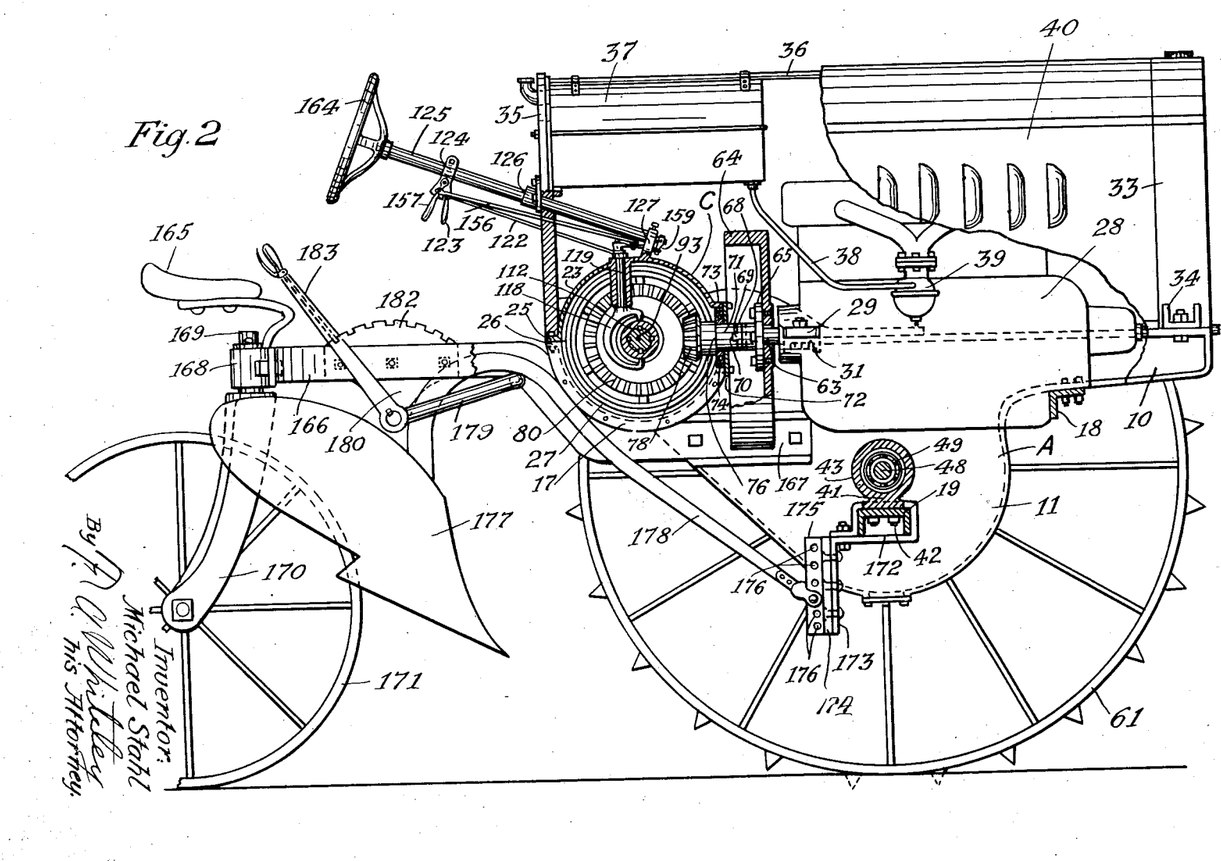
Fig. 2 is a side elevation similar to Fig. 1, taken on a section substantially through the center of the machine.

As illustrated in Figs. 2 and 3 the motor shaft 63 is splined to a fly wheel 64 and to a head 65 bolted to the fly wheel into which the shaft 63 extends. The head 65 is provided with a transverse slot 66 which receives a tongue 67 on a coupling member 68 which is provided with a second tongue 69 that projects into a slot 70 on a drive shaft 71 which extends through a plate 72 bolted to a projection 73 formed at the meeting point of the members A, B and C. Between the plate 72 and a shoulder 76 on shaft 71 is a ball bearing 74 in which the shaft is journaled. The coupling 68 provides a certain flexibility between the engine shaft 63 and a drive shaft 71 and at the same time admits of the ready removal of the motor by simply unbolting the same and lifting it up. In the above manner the drive shaft is brought into the closed chamber 27 where, in conjunction with the communicating chambers 14 all of the transmission, driving and other gear of the traction engine is housed. Upon shaft 71 is a bevel pinion 78 which is held in mesh at the same time with two bevel gears 80 and 81 loose on a thickened portion 82 of a shaft 83 which is positioned at the axial center of chamber 27. The shaft 83 has fast thereon outside of the hubs of bevel gears 80 and 81 collars 84 and 85 which engage shoulders 86 on enlarged portion 82 of shaft 83. A spring 87 surrounds shaft 83 and extends between collar 84 and a hub 89 of a cone clutch member 90 splined on shaft 83 and adapted to cooperate with a complemental clutch member 91 fast on a sleeve 98 carrying a pinion 88 said sleeve and pinion being loose on shaft 83, the spring 87 normally holding the members 90 and 91 in operative engagement.
Similarly a spring 92 surrounds shaft 83 and extends between collar 85 and hub 93 of a cone clutch member 94 splined on shaft 83, the spring 92 normally holding clutch member 94 in operative engagement with a complemental clutch member 95 which is fast on a sleeve 96 carrying a pinion 97, said sleeve and pinion being loose on shaft 83. A plate 99 is bolted to casting members, B and C as indicated in Fig. 1, and has an annular flange 100 extended through a circular opening in the casing. Inside of this flange and between the head 99 and the pinion 97 is a ball bearing 101 which provides a journal for one end of shaft 83 said shaft projecting through plate 99 and having a pulley 102 thereon, as shown in Fig. 3. The other end of shaft 83 is similarly journaled in ball bearings between pinion 88 and a plate head 103 bolted to the casing members and having an inwardly extended annular flange 104. The pinion 97 meshes with a spur gear 105 extending into the housing chamber 14 of casting B and fast on a shaft 106 journaled between the walls 12 and 13 of said housing with its outer end in a plate 107 bolted over an opening in the outer wall 13 of depending portion 11, as clearly shown in Fig. 1. The shaft 106 has thereon a pinion 108 meshing with a spur gear 109 which is bolted to the lug 54 on axle section 46. Similarly, axle section 45 has driving connection with pinion 88 through spur gear 109, pinion 110 and spur gear 111 all housed in chamber 14 of casting A. It will thus be seen that whenever shaft 83 is driven in either direction it is normally in direct driving connection with the traction wheels through pinions 88 and 97 and the various gear connections within the housing chambers 14 and 27.

Figure 7:
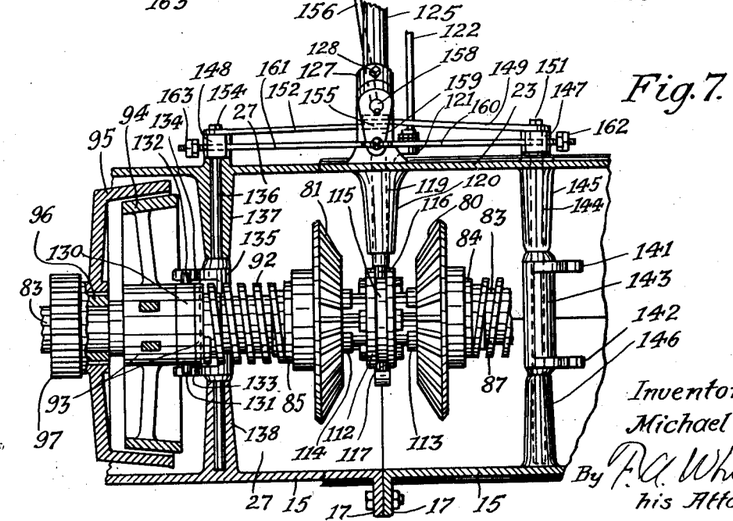
Fig. 7 is a vertical sectional view taken substantially on line 7—7 of Fig. 6.

The bevel gears 80 and 81 being both constantly driven in opposite directions by bevel pinion 78 are, of course, normally loose on shaft 83 and therefore normally inoperative. Means is provided for controllably connecting one or the other of said bevel gears to shaft 83 for forward or reverse drive as may be desired. As best shown in Figs. 2 and 7, a double clutch member 112 is splined to shaft 83 between gears 80 and 81 each of which is provided with coöperative clutch members 113 and 114 respectively. The clutch 112 is formed with a groove 115 in which are the ends 116, 117 of a fork 118 which is fast on a vertical shaft 119 journaled in a boss 120 depending from the top of casing member 23. The shaft 119 extends to the outside of the casing 23 and has secured thereto an arm 121 which is connected by a link 122 with a hand lever 123 pivotally connected to a bracket 124 fast on a post 125. This post extends angularly through a support 126 on the board 35 and a stand 127 extended upwardly from the casing 23, the post being held rigid in its supports by a bolt 128, as best shown in Fig. 7. By operating the lever 123 the shifter fork 118 may be oscillated to take the clutch member 112 from its central or neutral position into coöperative relation with gear 81 or gear 80, when the traction engine will be driven in either forward or reverse direction as desired. This drive will take place when clutch members 90 and 94 are in normal coaction with clutch members 91 and 95. Means are provided for withdrawing said clutch members simultaneously from operative position and in practice the clutch 112 will ordinarily be shifted only when the cone clutch members 90 and 94 are inoperative.

Figure 6:
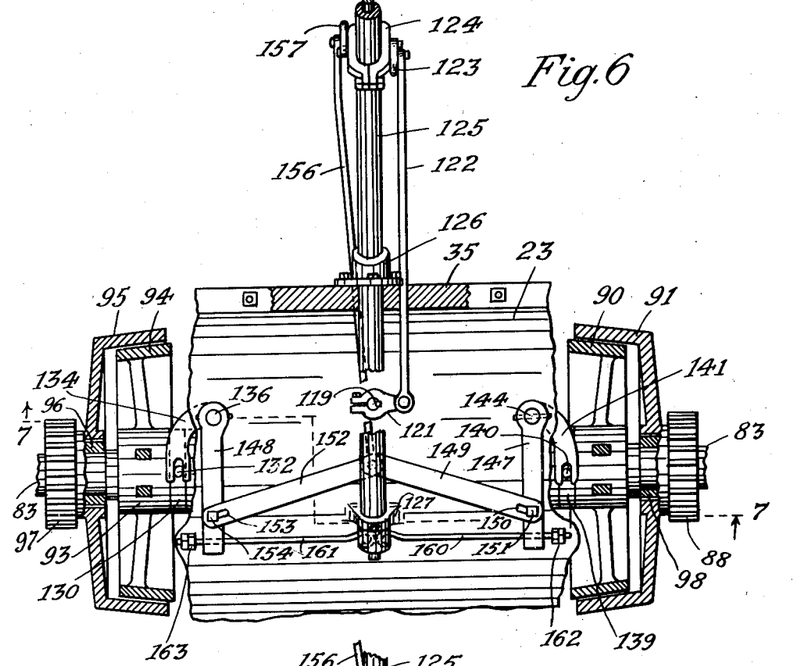
Fig. 6 is a plan view of some of the parts shown in Fig. 4 with said parts in a different position.

The means for holding said members inoperative is described as follows: A collar 130 in a groove formed in hub 93 of the clutch member 94 has trunnion pins 131, 132 which are received in the slotted ends of arms 133, 134 fast on a sleeve 135 which is carried by a pin 136 centrally journaled in vertically alined lug members 137, 138 formed in conjunction with the walls 23 and 15 of chamber 27. Similarly a collar 139 on hub 89 of clutch member 90 has trunnion members 140 extended in the slotted ends of arms 141, 142 on a sleeve member 143 carried by a pin 144 journaled in vertically alined lug members 145, 146, as best shown in Figs. 6, 7. Fast on pin 136 above the portion 23 of casting C is an arm 147 substantially parallel with a similar arm 148 fast on the upper end of pin 136. A link 149 is connected by a slot 150 and a headed pin 151 with the arm 147 at a point near the forward end of said arm. Similarly a link 152 is connected by slot 153 and bolt 154 with arm 148. The links 149 and 152 overlie one another, as indicated at 155 in Fig. 7 and there are pivotally connected with a rod 156 extending along post 125 to a lever 157 journaled to the stand 124 on post 125. In the position of the parts illustrated in Fig. 6 the lever 157 has been operated to draw the links 149, 152 forward on the principle of a toggle thus rocking the pins 144 and 136, and through action of the two sets of shifter arms connected with said pins has simultaneously drawn inward the clutch members 90 and 94 thus disconnecting the driving mechanism from the transmission. When the corresponding parts are in the position shown in Fig. 4 the springs 87 and 92 are active to hold the clutch members 90 and 94 in operative position.

A shaft 158 journaled in the stand 125 has an arm 159 on the lower end thereof. Two oppositely extended links 160, 161 are pivotally connected with the arm 159 at their inner ends and extend respectively through apertures in the outer ends of arms 147 and 148. Nuts 162 and 163 on the ends of rods 160 and 161 are adapted to engage the arms 147 and 148 respectively when either of the links 160 or 161 is operated. This is effected by rotating the shaft 158 by means of a hand wheel 164 fast on shaft 158 which is located above and in front of the operator's seat 165. This constitutes the steering mechanism of the machine and is operated in exactly the same manner in which the usual steering wheel of an automobile is operated and with the same results. Thus when the wheel 164 is turned to the right, as has been done in the position of parts illustrated in Fig. 4, the rod 161 has through nuts 163 actuated the arm 148 and from that through pin 151 and shifter arms 133, 134 has moved the inner clutch member 94 against the force of spring 92 into inoperative position, thus terminating the drive of the right hand tractor wheel while clutch member 90 has remained operative and the left hand tractor wheel is being driven. The result of this is that the traction engine will turn to the right and turn very sharply where the clutch member 94 is entirely disconnected. Any degree of gradual turning may be effected by releasing the clutch member 94 more or less. Left hand turning of steering wheel 164 will similarly operate to turn the tractor to the left. In this manner the tractor is steered entirely by the driving means, and by connecting and disconnecting either thereof from one or the other of traction wheels and through the operation of a steering wheel in the same manner that an automobile or truck is steered. The seat 165 is supported upon a supplemental U frame 166 having the arms thereof bolted to the depending portions 11 of castings A and B as indicated at 167 in Fig. 2. A journal piece 168 is secured to the central rear portion of the U piece 166 and has journaled thereon the shaft 169 of the yoke 170 for a trailer or caster wheel 171. The wheel 171 is not controlled by the operator but has an important function in assisting in automatically guiding the machine when the same is used for plowing as will be hereinafter pointed out.

The drawbar of the machine comprises a clamp 172 embracing the cross bar 19 at its middle point. The clamp 172 has a depending portion 173 to which is riveted an angle member 174 having in its rearwardly extended flange 175 a multiplicity of holes 176 to which a plow, cultivator or any other device may be secured. While the member 172 is shown as at the center on cross bar 19 it is obvious that it may be shifted to either side of such center to produce excess draft upon one or the other of the traction wheels, as may be desired, and also that two or more of such clamp members may be applied to cross bar 19 for connection with a device drawn by the machine if that should be desirable.

In the embodiment shown an ordinary plow 177 has its beam 178 connected with member 172 through the flange 175. As a convenient means of operating the plow 177 the beam 178 is shown as passing over a crank 179 having its rear ends journaled in hangers 180, 181 secured to the sides of the U-frame 166. The hanger 180 embodies a rack segment 182 with which coöperates a ratchet carried by a lever 183 by means of which the crank 179 is operated to lift or lower the plow, as indicated in Figs. 2 and 1. Having reference particularly to Fig. 3 it will be noted that when the device has been employed for plowing, the traction wheel 62 travels in the furrow already plowed and along the furrow indicated in dotted lines at 184, while the caster wheel 171 travels in the furrow which is being plowed and along the wall thereof as indicated at 185. This is made practicable because the entire machine is very narrow and the plow will be of a width to turn a furrow equal to the distance from the traction wheel to a point past the center line of the machine. In this manner the traction engine while plowing is guided by the walls both of the furrow previously made and a furrow which is just being plowed and will readily jump across dead furrows and low spots without tending to be diverted from the furrow.

The advantages of my invention will be apparent. An exceedingly strong and compact frame is provided which is nevertheless of very light weight. The tractor as a whole with the wheels positioned close to the frame is very narrow gage and suitable for running between rows of corn. These wheels can, however, be extended for spacing them wider and suited to straddling rows of corn. There is no waste space in the construction. The operative parts are all effectively housed by the castings. Access to any of these parts, however, is readily obtained by removal of the bolts which permits withdrawal of any of the bearing devices. The arrangement permits a hood to cover and protect the entire body of the machine. The double control of the traction wheel drive clutch members permits drive on the wheels instantly to be disconnected from both wheels or from either wheel at will thus effecting steering by drive alone, and entirely eliminates the use of a differential. The central transverse housing for the various parts provides convenient and efficient support for the control members close to the seat of the operator. The fact that the clutches are controlled by a steering wheel in the usual way greatly facilitates the operation of the device as it enables one familiar with the usual practice of steering automobiles effectively to steer the tractor. Finally, the narrow, compact arrangement of the parts makes it practicable in plowing to run one of the traction wheels in the advance furrow in contact with a furrow wall and the caster wheel in the rear furrow in contact with the furrow wall, thus insuring the most effective possible organization of elements for holding the machine in a fixed line of travel at all times to plow a furrow of maximum width. The lightness of the machine and reduction of the number of parts makes the machine cheap to build, and the housing and completely effective oiling of all of the operative parts by the direct splash system together with a direct spur gear drive makes the machine economical in operation.

I claim:

1. A traction engine comprising a frame consisting of two side member castings each formed with inwardly-projecting rear portions, said portions being bolted together at the median line of the traction engine, said castings embodying connected chambers, and a cap member bolted to both castings and forming in conjunction therewith housing chambers for all transmission and drive elements, 2. A traction engine comprising a frame consisting of two side member castings each formed with inwardly-projecting rear portions, said portions being bolted together at the median line of the traction engine, said castings embodying connected chambers, a cap member bolted to both castings and forming in conjunction therewith housing chambers for all transmission and drive elements, and transverse bars secured to and between said castings.

3. A traction engine comprising a frame consisting of two side member castings each formed with inwardly-projecting rear portions, said portions being bolted together at the median line of the traction engine, said castings embodying connected chambers, a cap member bolted to both castings and forming in conjunction therewith housing chambers for all transmission and driving elements, and a transverse bar secured to and between the central portions of said castings.

4. A traction engine comprising a frame consisting of two side member castings each formed with inwardly-projecting rear portions, said portions being bolted together at the median line of the traction engine, said castings embodying connected chambers, a cap member bolted to both castings and forming in conjunction therewith housing chambers for all transmission and drive elements, a transverse bar secured to and between the central portions of said castings, and a traction wheel and axle member for driving the same having journaled support upon said bar and within said casting.

5. A traction engine comprising a frame consisting of two side member castings each formed with inwardly-projecting rear portions, said portions being bolted together at the median line of the traction engine, said casting embodying connected chambers, a cap member bolted to both castings and forming in conjunction therewith housing chambers for all transmission and drive elements, a transverse bar secured to and between the central portions of said castings, a pair of traction wheels and separate drive axles therefor having journaled support at their inner ends upon said bar and at their outer ends within said side casting members.

6. A traction engine comprising a frame consisting of casting members secured together, said frame embodying longitudinal side members and a tubular transverse frame member extending between and uniting the front ends of said side members for providing a housing for transmission gears.

7. A traction engine comprising a frame consisting of casting members secured together, said frame embodying longitudinal side members, a tubular transverse frame member extending between and uniting the said side members, and housing chambers formed in said side members and connected with the interior of said tubular transverse member.

8. A traction engine comprising a frame consisting of casting members secured together, said frame embodying longitudinal side members and a tubular transverse frame member extending between and uniting the front ends of said side members for providing a housing for transmission gears, and a transverse bar secured to and between the rear portion of said side members.

9. A traction engine comprising a frame including a transverse bar, a pair of traction wheels, separate drive axles therefor each having independent journaled support at its inner end upon said bar, and a bar fast at the axial center of each of said traction wheels and having sliding adjustable connection for rotation with and by the drive axles.

10. A traction engine comprising a frame and a pair of traction wheels supporting the same, a separate drive axle for each traction wheel, and a bar fast at the axial center of each of said traction wheels and having sliding adjustable connection for rotation with and by the drive axles.

11. A traction engine comprising a frame and a pair of traction wheels supported thereby, a square axle bar fast at the axial center of each of said traction wheels, a pair of driven axles journaled in alinement in the frame each having therein a square aperture for receiving the bar, and means for securing the bars in adjusted position within the driven axles whereby the traction wheels may be positioned different distances apart.

12. A traction engine comprising a frame and a pair of traction wheels supporting the same, a pair of separate driven axles journaled in said frame, traction wheel shafts slidable in said axles, and means adjustably connecting the shafts of the traction wheels with the driven axles adapted to permit various positions of separation of said traction wheels.

13. A traction engine comprising a frame including a transverse member, a stand secured to the center of said member, a pair of driven axles independently journaled at their inner ends on said stand and at their outer ends in the frame, a pair of traction wheels, and means for adjustably connecting said traction wheels with the driven axles adapted to permit various positions of separation of said traction wheels.

14. A traction engine comprising a frame including parallel walled housing chambers at the sides and a transverse member connecting said housing chambers, a pair of axle members having journaled support at their inner ends upon said transverse member and extending across said respective chambers and having journaled support at their outer ends in the outer walls of said chambers, driving means within the chambers for driving said axle members, a pair of traction wheels, and means connecting said traction wheels with the axle members adapted to permit various positions of separation of said traction wheels.

15. A traction engine comprising a frame including parallel walled housing chambers at the sides thereof, the outer walls of said housing members having formed therein extended openings, plate members for sealing said openings having flanged portions extended therein, and driving axles having ball-bearing journaled support within said flanges in the plane of said walls.

16. A traction engine comprising a frame including parallel-walled housing chambers at the sides and a transverse member between and connecting said housing chambers, the outer walls of said housing members having formed therein extended openings, plate members for sealing said openings having flange portions extended therein, and driving axles having journaled support at their inner ends upon said transverse member and having ball-bearing journaled support at their outer ends within said flange members in the plane of said outer walls, means within the housing chambers for driving the axle members, and traction wheels connected with said axle members.

17. A traction engine comprising a frame consisting of casting members secured together, said frame embodying longitudinal side members, a tubular transverse frame member extending between and uniting the said side members, housing chambers formed in said side members and connected with the interior of said tubular transverse member, a pair of traction wheels supporting said frame, and means within said housing for operating the traction wheels.

18. A traction engine comprising a frame consisting of casting members secured together, said frame embodying longitudinal side members, a tubular transverse frame member extending between and uniting the said side members, housing chambers formed in said side members and connected with the interior of said tubular transverse member, a pair of traction wheels supporting said frame, means within said housing for operating said traction wheels either to drive the same simultaneously or separately either in reverse or forward direction, and means mounted upon the tubular member for controlling said driving means.

19. A traction engine comprising a frame embodying a transverse housing, traction wheels, a driven shaft in said housing having connections therefrom adapted to drive said traction wheels including a pair of sliding clutch members fast on the shaft, means journaled in the central housing including a separate arm outside of the housing for shifting each clutch member independently into inoperative position, a steering post, a hand wheel on said post and connections therefrom to said arms for operating either of said arms alternately when the wheel is turned in either direction, and a lever on said post and connections therefrom for operating said arms simultaneously.

In testimony whereof I affix my signature.

MICHAEL STAHL.